No. 641,480. Patented Jan. 16, 1900.
C. H. TURNER.
CATTLE STANCHION.
(Application filed Sept. 6, 1899.)
(No Model.)
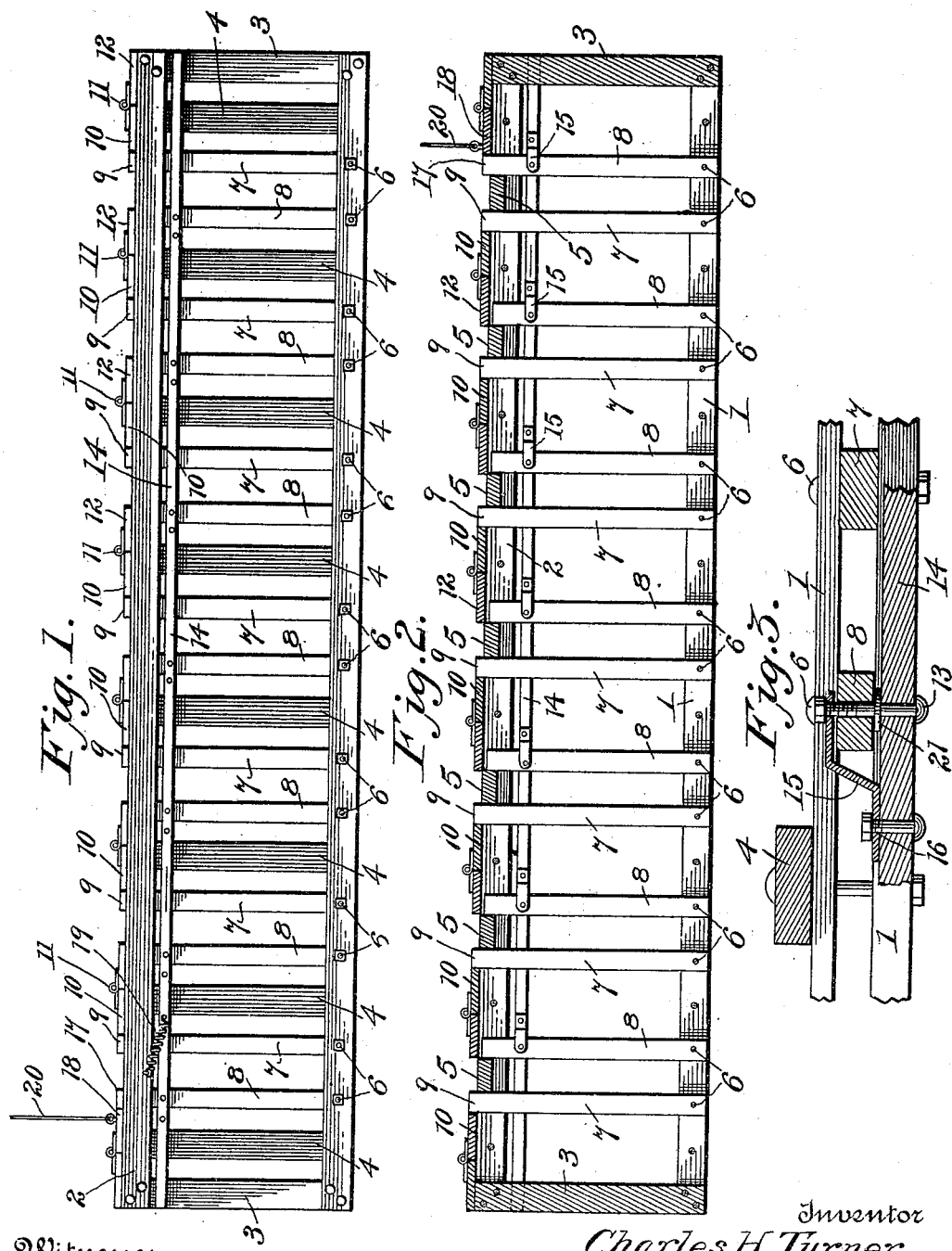
Witnesses
Edwin G. McKee.
P. M. Smith.
Inventor
Charles H. Turner
by C. G. Siggers
Attorney
THE NORRIS PETERS CO., PHOTO-LITHO., WASHINGTON, D. C.

UNITED STATES PATENT OFFICE.

CHARLES H. TURNER, OF WESTPHALIA, KANSAS.

CATTLE-STANCHION.

SPECIFICATION forming part of Letters Patent No. 641,480, dated January 16, 1900.

Application filed September 6, 1899. Serial No. 729,628. (No model.)

*To all whom it may concern:*

Be it known that I, CHARLES H. TURNER, a citizen of the United States, residing at Westphalia, in the county of Anderson and State of Kansas, have invented a new and useful Cattle-Stanchion, of which the following is a specification.

This invention relates to cattle-stanchions, and has for its object to provide, in connection with a plurality of stanchions, means whereby the stanchions may be individually manipulated or collectively operated.

In the operation of cattle-stanchions on large stock-farms it is important to construct the stanchions so that the cattle may be individually fastened, as a large number of animals cannot well be secured at the same time. It is also important to make the stanchions capable of individual operation, so that a single and any particular animal may be released without disturbing the others. At other times it is desirable to simultaneously release all of the animals.

The present invention is designed with special reference to the requirements above enumerated and at the same time a simple, economical, and durable construction is attained.

Other objects and advantages of the invention will appear in the course of the subjoined description.

The invention consists in certain novel features and details of construction and arrangement of parts, as hereinafter fully described, illustrated in the drawings, and incorporated in the claims.

In the accompanying drawings, Figure 1 is a rear elevation of a multiple cattle-stanchion constructed in accordance with the present invention. Fig. 2 is a central vertical longitudinal section through the same. Fig. 3 is a detail horizontal section showing the connection between one of the pivot stanchion-bars and the common operating-bar.

Similar numerals of reference designate corresponding parts in all the figures of the drawings.

In constructing a plurality of stanchions in accordance with the present invention parallel base boards or timbers 1 are provided, which, if desired, may extend the entire length of the barn or stable. Arranged at a suitable distance above the base-timbers 1 are parallel top bars or upper timbers 2, arranged horizontally and extending parallel to the base-timbers. The timbers 1 and 2 are connected by end uprights 3, the ends of which are let in between the parallel members of the base and upper timbers and bolted or otherwise firmly secured thereto, thus forming a rectangular frame. The upper and lower timbers are also connected at intervals by vertical guide-boards 4, arranged at a distance apart equal to the space allotted to each animal. These boards partially close the open space between the stanchions and keep the hay and fodder from working out under the feet of the cattle. The upper and lower timbers 1 and 2 are also held at the proper distance apart by means of spacing-blocks 5, interposed between the same and secured in any convenient manner. Each stanchion comprises two uprights of stanchion-bars, both of which are pivotally mounted, as shown at 6, between the base-timbers. The stanchion-bars (indicated at 7 and 8) extend at their upper ends between the upper parallel timbers 2, and the bar designated by the numeral 7 is extended above the top of the frame or beyond the upper edges of the timbers 2 to form a projecting end 9, which lies between one of the spacing-blocks 80 5 and the free end of a pivoted latch 10, which normally rests upon the top of the frame and is hinged, as at 11, to a stationary block or cap 12, securely fastened to the top of the frame and arranged over the top of one of the 85 bars 8. A separate and independent latch 10 is provided for each individual stanchion-bar 7, and said stanchion-bars are in this way held in their operative position. The other stanchion-bar, 8, is shorter and does not extend above the top of the frame, but terminates between the parallel timbers 2. The movement of the bar 8 in the direction of the bar 7 is limited by one of the spacing-blocks 5, but is free to move in the opposite direction or away from the bar 7 and is pivotally connected by means of a bolt or other suitable fastening device 13 to a common operating bar or rod 14, which extends lengthwise of the frame and horizontally, the said bar 14 being pivotally connected to all of the bars 8 of the several stanchions, so that all of the said bars may be simultaneously vibrated for releasing the stock. In order to establish a firm connection between the bars 8 and common operating bar or rod 14, angular brackets or clips 15 are provided, one end being bolted or otherwise secured to the bar 14, as shown at 16, and the opposite end laterally offset to embrace the bar 8 and to receive the bolt or other pivot 13, which passes through said bracket and also through the bars 8 and 14.

All of the bars 8 are shorter than the bars 7, with the exception of the terminal bar 8, which is extended above the timbers 2 to provide a projecting end 17, adapting said bar to be held in an upright position by means of a main end latch 18, mounted upon a frame in a manner similar to the latches 10, hereinabove described, the said latch serving to lock the terminal stanchion-bar 8 in fixed operative position and through the medium of the common operating-bar 14 serving to lock all of the stanchion-bars 8 in similar positions.

A sufficient number of contractile springs 19 may be interposed between the common operating-bar 14 and one of the upper timbers 2 to draw back the bar 14 upon the disengagement of the latch 18, and thereby simultaneously release all the animals, and the terminal latch 18 may have attached thereto a cord, wire, or other connection 20, extending to any desired point and outside of the building, if desired, where it may be operated by an attendant without the necessity of going near the animals. This last feature will be found of special advantage in case of fire. In order to reduce friction between the bars 8 and 14, washers 21 are preferably interposed between said bars, the said washers encircling the bolts or pivots 13.

From the foregoing description it will now be apparent that by reason of the particular manner of mounting the stanchion-bars of each stanchion and connecting the same, as described, the stanchion-bars may be individually released or fastened, and they are also capable of being collectively and simultaneously operated either to open or close the stanchion, thus enabling all the animals to be released at one time. Thus the animals may be individually or collectively released and individually fastened by the stanchion-bars.

From the foregoing it is thought that the construction, operation, and many advantages of the herein-described invention will be apparent to those skilled in the art without further description, and it will be understood that changes in the size, shape, proportion, and minor details of construction may be resorted to without departing from the spirit or sacrificing any of the advantages of the invention.

Having thus described the invention, what is claimed, and desired to be secured by Letters Patent, is—

1. The combination of a plurality of stanchions, each consisting of two stanchion-bars both of which are pivoted at corresponding ends to the stanchion-frame, one bar of each stanchion being engaged by an individual latch on the frame, and the other bar connected to a common operating-bar for simultaneously opening and closing all the stanchions, substantially as described.

2. The combination of a plurality of stanchions, each consisting of two stanchion-bars, both of which are pivoted at corresponding ends to the stanchion-frame, one bar of each stanchion being engaged by an individual latch on the frame, and the other bar connected to a common operating-bar for simultaneously opening and closing all the stanchions, and a terminal latch pivotally mounted on the frame for holding said common operating-bar, substantially as described.

3. The combination of a plurality of stanchions, each consisting of two stanchion-bars of unequal length both pivoted at corresponding ends to the stanchion-frame, individual latches on the frame for each of the longer stanchion-bars, a common operating-bar operatively connected to all of the shorter stanchion-bars, and means for locking the common operating-bar, substantially as described.

In testimony that I claim the foregoing as my own I have hereto affixed my signature in the presence of two witnesses.

CHARLES H. TURNER.

Witnesses:
CLYDE KING,
J. W. CENTER.